United States Patent [19]
Rossi

[11] 4,342,024
[45] Jul. 27, 1982

[54] VEHICLE BURGLAR ALARM APPARATUS WITH ELECTRONIC MEMORY AND DIGITAL DISABLING COMBINATION

[75] Inventor: Giovanni Rossi, Milan, Italy

[73] Assignee: R.B.M. S.r.l., Milan, Italy

[21] Appl. No.: 228,712

[22] Filed: Jan. 27, 1981

[30] Foreign Application Priority Data

Jan. 29, 1980 [IT] Italy .................. 19550 A/80

[51] Int. Cl.³ .................. H04Q 3/02; G08B 13/22
[52] U.S. Cl. .................. 340/64; 340/825.56; 307/10 AT
[58] Field of Search .................. 340/52 R, 53, 63, 64, 340/825, 825.56, 825.36; 307/10 AT

[56] References Cited
U.S. PATENT DOCUMENTS 4,205,325  5/1980  Haygood et al. .................. 340/63

Primary Examiner—Alvin H. Waring
Attorney, Agent, or Firm—Karl F. Ross

[57] ABSTRACT

Burglar alarm apparatus particularly for motor-cars or the like, comprising an electronic memory with digital combination, associated with a microcomputer for controlling all the functions of the apparatus with no need to manually control its enabled or disabled operation modes, which automatically take place when the combination valid for operation has been entered.

The opportunity of starting the engine by means of the ignition key, with the valid combination entered, is also provided for, in order to permit the parking manoeuvres, still keeping on the function of automatically enabling the apparatus when the engine is stopped.

19 Claims, 8 Drawing Figures

VEHICLE BURGLAR ALARM APPARATUS WITH ELECTRONIC MEMORY AND DIGITAL DISABLING COMBINATION

BACKGROUND OF THE INVENTION

1. Field of the Invention

The present invention refers to a burglar alarm apparatus with electronic memory and digital disabling combination, particularly for use in motor-cars, motor-boats or the like.

2. Description of the Prior Art

Many types of burglar alarm apparatuses for motor-vehicles are known on the market, most of which consist of hidden switches located inside the vehicle or in the motor compartment, which apparatuses allow the starting circuit and/or the ignition circuit of the engine to be broken. Also more sophisticated apparatuses consisting of integrated circuits with timing relays, so called "electronic" and operated through digital combination device or the like, are known. Equally it is known that the "electronic" apparatuses on the market require that the predetermined combination is entered in order to both enable and disable the apparatus; further, these apparatuses are generally very sensitive to atmospheric condition changes and to vibrations, whereby the acoustic alarms controlled by them can come into operation by chance; at last they can also be readily disabled by specialists who are up to no good.

SUMMARY OF THE INVENTION

The main object of the present invention is to provide an electronic burglar alarm apparatus capable of overcoming the drawbacks of the known apparatuses and expecially capable of warranting a full protection of the vehicle against both the attempts of starting the engine and the violations or the attempts of opening doors, bonnets, lids and quarter vents.

Another object of this invention is to provide an electronic burglar alarm apparatus which, by using a microcomputer in combination with an electronic memory for controlling all the functions of the apparatus, is capable of securing a drastic decreasing in the number of operations required for its enabling and disabling and is capable of being automatically enabled or put in its state of readiness when the ignition key is extracted, without particular enabling actions.

Further, the electronic burglar alarm of the present invention is designed so as to eliminate the use of the ignition key for starting the engine with the apparatus disabled and to provide an engine starting key which is operative only after the valid combination has been entered, whereas the engine is stopped by means of an engine stop key.

Another advantageous feature of this apparatus is to provide expecially designed electronic circuits capable of allowing the engine to be normally started by means of the ignition key, when the valid combination has been entered, as it is required during parking in public garages, still retaining the capability of automatically enabling the apparatus by simply extracting the ignition key, at next engine stop, performed by means of the engine stop key.

These objects and corresponding advantages are effectively achieved in practice by an electronic burglar alarm apparatus with a disabling combination, which can be disabled by entering a valid combination and is automatically enabled when the ignition key is extracted.

According to the present invention, a burglar alarm apparatus with electronic memory and digital disabling combination, particularly for use in motor-cars, motor-boats or the like, comprises:

(a) an electronic control board having:
  (i) a keyboard provided with a plurality of digit combination entering keys, an engine start key, an engine stop key, a garage key, by means of which garage key the apparatus can be disabled after a valid combination has been entered, still keeping the normal ignition key operation on,
  (ii) a processing unit, responsive to said keyboard and preferably including a microcomputer, controlling the operation of the whole apparatus, an electronic memory connected to said microcomputer and having the initial combination stored in, a reset circuit for generating an enabling reset signal for said microcomputer whenever said stop key is depressed; and (b) an electronic actuating board, responsive to said electronic control board and acting on the main engine circuits and alarms, having:
  (i) a driver circuit responsive to the microcomputer outputs and issuing control signals, upon the ignition key insertion, to the power relays which operate the signalling and electrical engine circuits of the motor-car,
  (ii) at least one alarm circuit with a time-delay relay.

More particularly, according to this invention, the reset signal is generated whenever the supply voltage for the processing unit drops under a predetermined level and whenever the stop key id depressed, as well.

Another feature of this apparatus is to provide a programming circuit designed to initially programming the electronic memory, i.e. to set the initial combination into the electronic memory. The programming circuit is enslaved to the microcomputer and operated by means of the stop key when a combination changing push-button is kept pushed. By this programming circuit it is possible to change the initial combination and transfer the new initial combination into the electronic memory, at the same time restoring the "wait for combination" state.

BRIEF DESCRIPTION OF THE DRAWING

In manner in which the foregoing and other objects are achieved in accordance with the present invention will be better understood in view of the following detailed description, set forth in an illustrative but not limitative way, with reference to the accompanying drawings in which.

DESCRIPTION OF THE PREFERRED EMBODIMENT

Figures 1, 2:
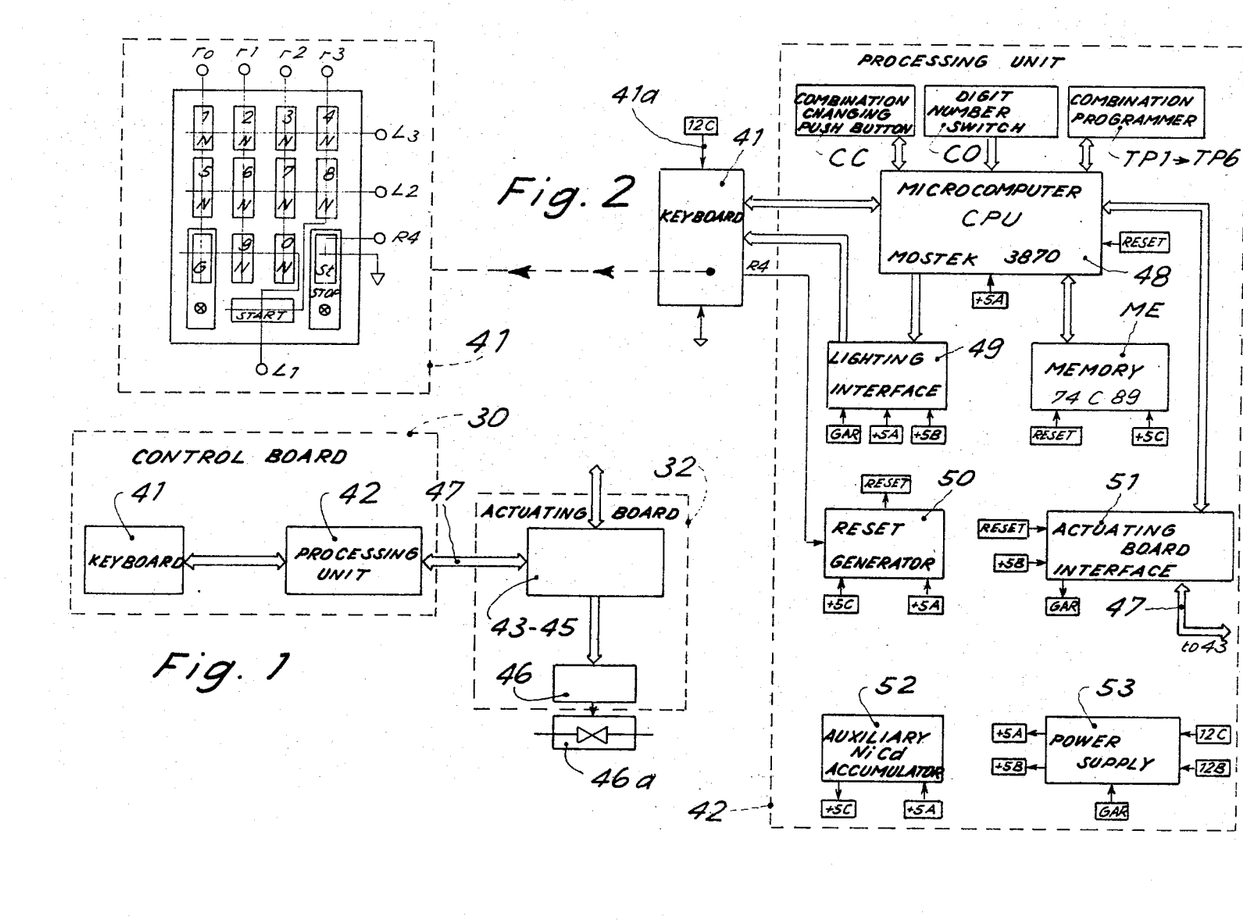
FIG. 1 is a block diagram of this apparatus, showing the electronic control board and the electronic actuating board.
FIG. 2 is a more detailed block diagram of the electronic control board.
Figures 3, 4A, 5A:
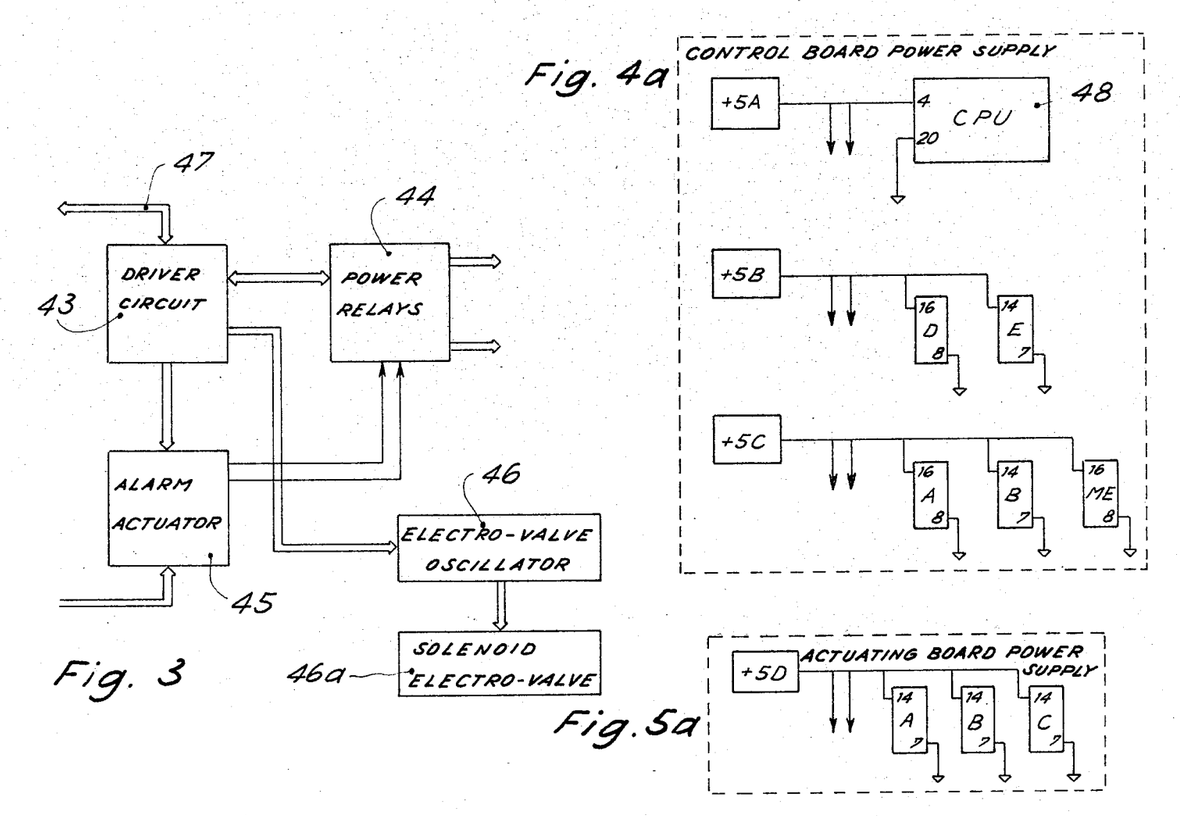
FIG. 3 is a more detailed block diagram of the electronic actuating board.
FIG. 4a is a block diagram showing the general power supply schematic for the integrated circuits and the components of FIG. 4.
FIG. 5a is a block diagram showing the general power supply schematic for the integrated circuits and the components of FIG. 5.

With reference to the accompanying drawings and particularly to the FIGS. 1, 2 and 3, the burglar alarm apparatus of this invention substantially comprises an electronic control board 30 and an electronic actuating board 32. The electronic control board 30 includes a keyboard 41 connected to a processing unit 42. The electronic actuating board 32 includes a driver circuit 43 (as seen in FIG. 3), a power relay circuit 44, an alarm actuator circuit 45 and an oscillator circuit 46 for energizing a solenoid electro-valve 46a designed for stopping the flow of fuel.

The connection between control board 30 and actuating board 32 is accomplished by means of a multiwire shielded cable 47. Preferably, the control board 30 is installed in the vehicle inside or cab, whereas the actuating board 32, designed for energizing the power relays, the electro-valve oscillator and the alarm circuits, is set up in the engine compartment. Obviously the two panels 30, 32 can be assembled in a single unit to be installed in the vehicle cab or in the engine compartment, as one likes.

With reference to FIG. 2, the components and circuits of the electronic control board 30 comprise a keyboard 41, energized through a terminal 12C from the vehicle battery, a microcomputer 48 (hereinafter cited as CPU-central processing unit-48) of the 2000 bit type, number 3870, commercially available from Mostek-Corp., an electronic memory ME, of the CMOS-RAM type, number 74 C 89, a lighting interface 49 designed for lighting the keys of the keyboard 41, a reset signal generator 50 and an actuating board interface 51 having a multiwire cable 47 as its output to the actuating board 32.

The control board 30 further comprises an auxiliary NiCd accumulator 52, with its charging circuit, used with the memory ME, and a power supply 53 designed for energizing the whole apparatus.

Figure 4:
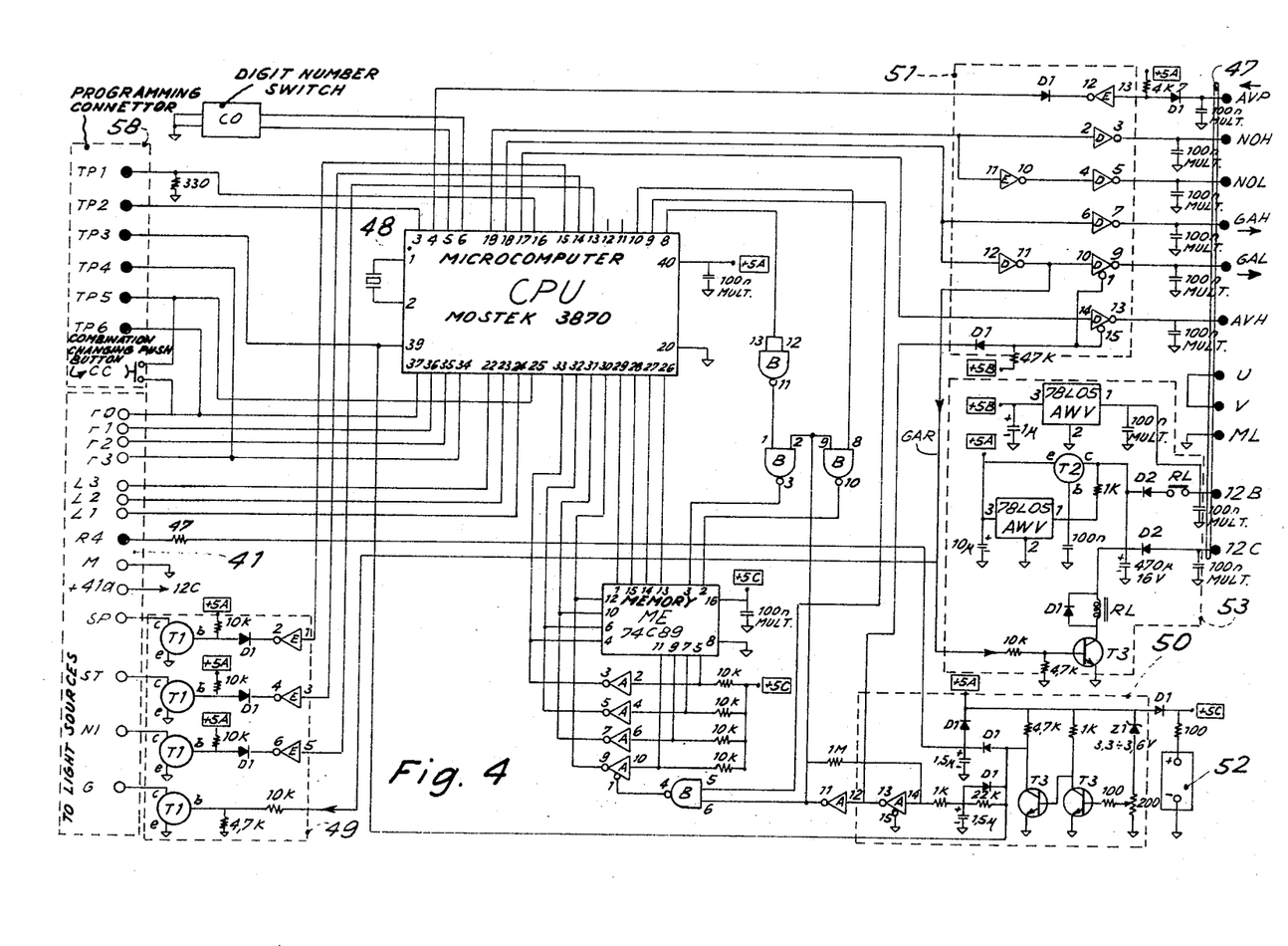
FIG. 4 is a circuit diagram showing the electronic components of the electronic control board, and their connections.

All the connections among the various components, located on the control board 30 and shown in block form in FIG. 2, are clearly recognized in the complete circuit diagram of FIGS. 4 and 4a.

With reference to the FIGS, 2, 4 and 4a, the keyboard 41 is in the form of an array having four columns r0, r1, r2 and r3, respectively, and three rows or lines L1, L2 and L3, respectively.

Ten digit combination entering keys N (0 to 9), an engine start key (St) and a garage key (G) are positioned at the insertions of the columns and the rows of the array, whereas an engine stop key (Sp) is separately mounted on the keyboard and acts on the general reset signal for the microcomputer (CPU) 48, as it will be better described later.

Keyboard 41 further comprises a terminal 41a, powered by 12 Volt c.c. (12 C from the battery), a socket R4 for CPU reset, both having a return to ground M, and whereas a combination changing push-button (CC) is located at the CPU box. Some light sources are located under the key caps and exactly: some lamps NI are located under the caps of the ten keys N in order to lighten them, one lamp ST lightens the engine start key St, whereas a green warning LED (light emitting diode) G is associated with the garage key G and a red warning LED SP is associated with the engine stop key Sp.

The light sources, i.e. the lamps and the LED's, are energized by a number of integrated circuits T1-E, forming an interface circuit between the CPU 48 and the light sources themselves. All the integrated circuits T1-E are connected to +5B, as shown in the supply schematic of FIG. 4a and they act so as to programmably energize the light sources under the control of the microcomputer. An electronic memory ME, of the type available on the market as "CMOS-RAM" memory, is connected to the microcomputer (CPU) 48 of FIG. 4 and serves as the storage of the initial combination; as this initial combination must not be lost if the vehicle battery fails, an auxiliary accumulator 52, of the Ni-Cd type is provided, which supplies the memory ME and its associated circuitry.

The circuitry associated to the memory ME handles the signals for writing and reading the combination digits and for enabling the apparatus or putting it in its state of readiness during the failure of the main power; it also drives all the transistors of the integrated circuits for turning on and off the light sources, in order that information loss is avoided.

The power supply 53 shown in FIGS. 2 and 4 sends the required supply voltages to all the circuits associated with the CPU 48 and keeps the CPU still powered when the ignition key is extracted, by means of a signal GAR provided for by the key G, in the case of garage operation, required, for instance, when the vehicle is housed in public garages.

Thus, in this apparatus, the CPU 48 has the following tasks: scanning the keyboard, acknowledging the combination and its length as the number of digit, sending controls, signalling and initial combination programming to the memory, which programming will be clarified later.

The scanning of the keyboard by the CPU occurs by energizing one column (r0 to r3) and reading the line or lines L1 to L3 that are pulled up in accordance with the connections made by depressing keys N.

Each time stop key Sp is depressed, and each time a wrong digit is entered, the CPU is reset, it reads from a digit number switch CO the number of digits of the valid combination and wait for the first digit of the combination.

Until all the valid digits in their right sequence (i.e. a combination equal to the initially set one, as it will be better explained in the foregoing) have been entered the CPU does not send any control and, as a consequence, does not disable the apparatus, keeping the keys N lightened, as a report of its state.

When a valid combination has been fully entered, the apparatus is disabled, the key lamps are switched off, the start lamp and the stop LED are switched on and the normal operation signals, NOH and NOL true (FIG. 4), are sent to the actuating board 32.

At this moment it is possible, by depressing the engine start key St, to start the car engine; however, CPU 48 only permits to start the engine after having tested a starting consent signal AVP (FIG. 4), coming from the actuating board 32, which signal AVP informs the CPU whether the engine has overcome a predetermined angular speed or not.

Infact, if signal AVP consents this, CPU 48 sends the control signal AVH to the actuating board; when signal AVP does not consent this, CPU 48 removes the control signal AVH and the start key St is switched off.

On the contrary, if garage key G is depressed after a valid combination has been entered, then CPU sends to the actuating board 32 the control signals GAL and GAH true, which disable all the keyboard functions, except the STOP function, and switch on the green warning LED of the key G. Further, the supply voltage to CPU 48 is kept on after the ignition key is extracted (drop of 12 C), by means of an automatic switching at the power supply circuitry 53 (FIG. 4), and the acoustic alarm devices are cut off.

This serves to enable the car to be parked, for instance in the garages, leaving the motor free to normally operate under the control of the ignition key, without having to enter the disabling combination, at the same time keeping on the opportunity of depressing the Stop key Sp at the next engine Stop and thus having the apparatus put in its state of readiness simply by extracting the ignition key.

Obviously the green LED is on only when the ignition key is inserted.

In FIG. 4 there is provided a programming circuit, separated from the CPU box and connected to it by means of a programming connector 58, useful for setting the initial combination into the memory ME. The initial combination is set by an exchange of signals among the points TP4-TP5-TP6 carried out by depressing the Stop key Sp. Stop key Sp inserts the programmer, which in turn shortcircuits the points TP4-TP5-TP6; for this purpose the reset signal is used, as present on TP3 and its related circuitry (FIG. 4). The reset signal is generated by circuitry 50 each time the supply voltage drops under a predetermined level and each time Stop key Sp is depressed.

The reset signal also serves to initialize the CPU operation and to disable the interface 51 (FIG. 2) to the actuating board, in order to prevent spurious controls from outcoming; point TP3, as already stated, carries the Reset signal, which is sent to the programmer.

Upon depressing and then releasing the Stop key Sp, CPU 48 first scans the shorted points: if these shorts are not present, CPU 48 proceeds according to its normal operation; if these shorts are present, i.e. the pushbutton CC closes, CPU 48 sends a digit request signal (character request signal) on point TP2. If the character arrives within a predetermined time, it is temporarily stored into a memory area used as buffer storage; after the predetermined time has elapsed, the operation proceeds in its normal mode. Each character is received at the point TP1 (FIG. 4) and CPU 48 is programmed so that it always requires seven characters or digits.

When all the seven characters have been receipt, they are transferred from the buffer storage to the memory ME of the same software module (programmed structure), which is operative upon the release of the combination changing key push-button CC (FIG. 4).

Under the normal operation conditions, besides the start key St, the combination changing push-button CC is operative as well.

The logic that handles the module is as follows: once the combination changing push-button CC has been depressed, START and STOP warning light sources are turned off and the digit key lamps are turned on; the digits are entered and the digit number switch CO enables the CPU 48 to hold the combination digits in number equal to number set by switch CO, as already stated.

Upon the release of the push-button CC, the new initial combination is moved from the buffer storage to the memory ME and the "wait for combination" state is restored.

In FIG. 4, a stabilized voltage regulator circuit is further shown, which serves to charge the auxiliary accumulator 52. At last, still in FIG. 4, integrated circuits D-E-T1-T2-T3 are shown downstream of the memory ME, which form, along with their circuitry (D1-D2-Z1, etc.), an interface, going to the actuating board (i.e. driver circuit 43, FIG. 5), for the signals outcoming from the control board and labelled as follows:

AVP=starting consent, sent by the actuating board to the control board;
GAH and GAL=guard operation mode signals;
NOH and NOL=normal operation mode signals;
AVH=engine starting signal; and
U-V=jumper for a tamper circuit, which causes the main supply to be grounded by SCR T4 (FIG. 5), when the multi-wire cable 47 is cut.

Figure 5:
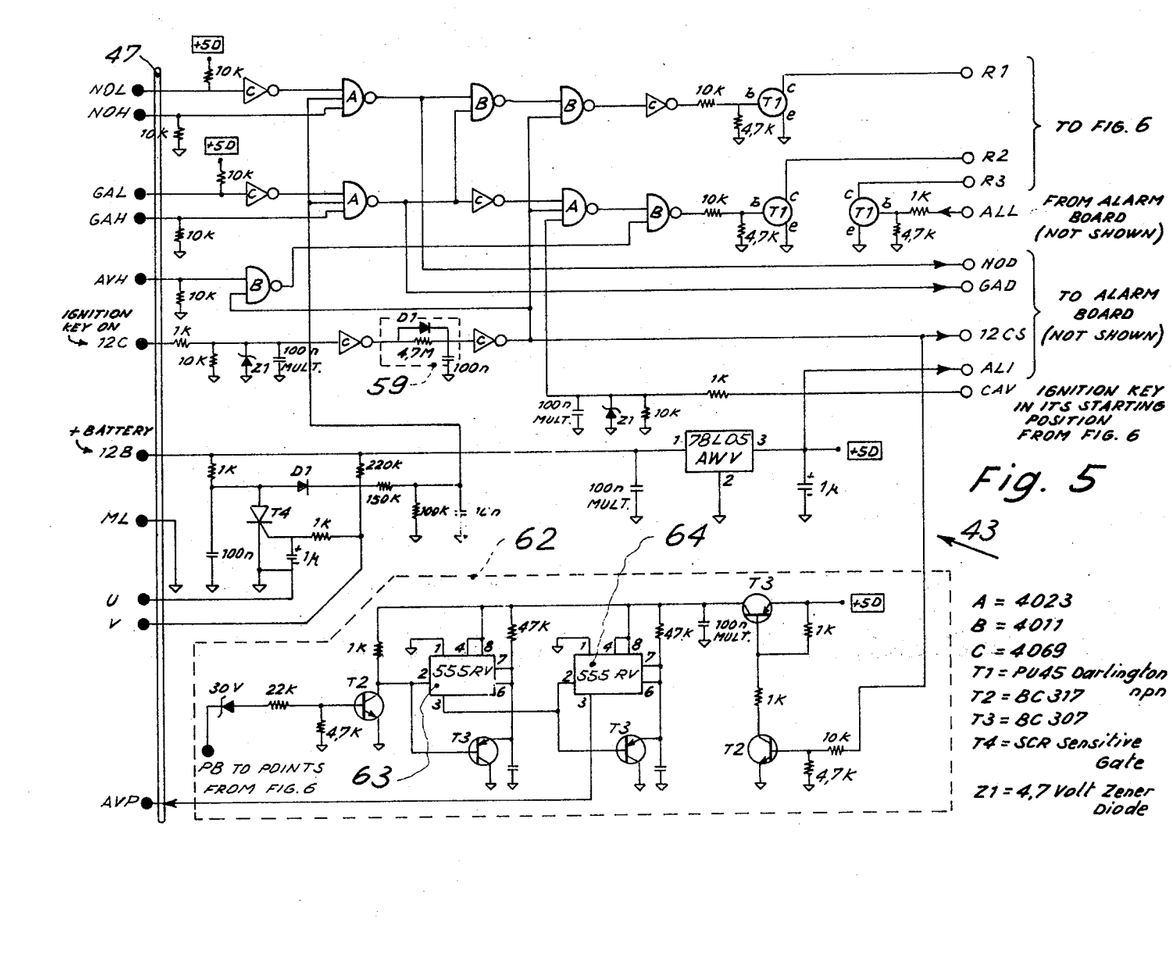
FIG. 5 is a circuit diagram showing the electronic components of the electronic actuating board, and their connections.

All these output signals are labelled in FIG. 4 with the same alphanumeric symbols used for labelling the input signals to the actuating board of FIG. 5. In order to make the understanding of FIG. 4 schematic easier, in FIG. 4*a* the power supply, for the various integrated circuits of the control board of FIG. 4, is shown in block form and in a schematic way. Therefore, CPU 48 is fed from the supply terminal +5A, I.C.'s D and E are fed from the supply terminal +5B at their pins 16 and 14, respectively and I.C.'s A and B and memory ME are fed from the supply terminal +5C (auxiliary accumulator 52) at their pins 16, 14 and 16, respectively.

As already stated, the driver circuit 43 (FIG. 5) of the actuating board 32 has, as its imput signals, the output signals coming from the control board 30; further in FIG. 5, a signal CAV is shown, by means of which the ignition key switches on and off the usual circuit for energizing the electric starting motor, also in the garage operation mode of this apparatus.

Figure 6:
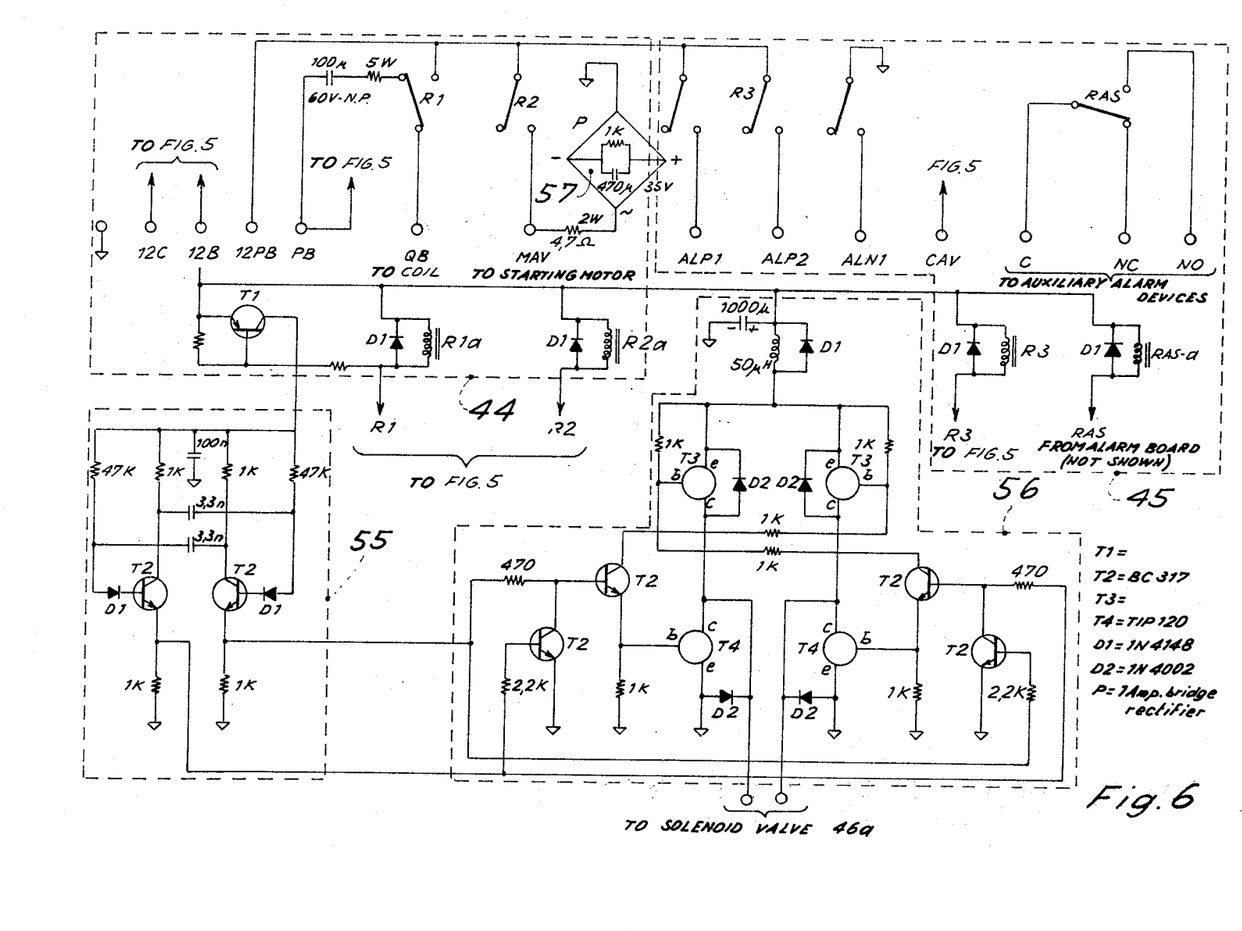
FIG. 6 is a circuit diagram of the power relays and the oscillator for driving the electro-valve, showing also a number of protection, signalling and delay circuits.

The driver circuit 43 (FIG. 5) is designed to receive the various signals sent by CPU 48, to decode them and to send them to the various power and signalling relays, as shown in FIG. 6. Therefore, at the output of the driver circuit 43 of FIG. 5 schematic the following signals are present:

Signal R1 that energizes relay R1*a* for powering the meter board QB, ignition coil and some other devices of the car;

Signal R2 that energizes relay R2*a* for powering the electric starting motor;

Signal R3 that energizes relay R3*a* which in turn energizes the servorelays for powering the head-lights and the horn through terminals ALP1, ALP2 and ALN1, respectively (FIG. 6), when the apparatus is in its alarm state.

The incoming signal ALL directly comes from the alarm board (not shown); the signal +12CS in FIG. 5 is a 12 volt cc. signal that serves to protect some components of the electrical plant; signals NOD and GAD are further provided in order to energize and deenergize a relay RAS (through its coil RAS-a) for powering and unpowering one or more alarm devices in case they were already present in the car.

In the driver circuit 43 of FIG. 5, a circuit is further shown, encompassed by box 62 and consisting of two timers 63 and 64, which circuit 62 substantially is a frequency discriminator circuit; it receives a signal PB from the connection between the ignition coil and the distributor points and send, as its output, the signal AVP, at a 12 volt level if the frequency of signal PB is lower than a frequency limit determined by the component values in the circuit 62, and conversely at zero volt level (ground) if signal PB frequency is higher than such a frequency limit. Signal AVP serves, as already stated, to detect the engine speed and thus to permit the starting command to be generated or not.

The various circuits that control the power relays are connected so that energization of these relays is subject to two condition: ignition key inserted and apparatus disabled.

At the moment the ignition key is inserted, a waiting time starts and only at the end of this waiting time, the "key inserted" signal 12CS is active in order to prevent erroneous controls upon starting.

The security against violations is achieved by means of the gate circuit of SCR T4, shorted to ground by a jumper U-V (FIGS. 4 and 5) through the cable 47, connecting the control board to the actuating board. In this way, each attempt to tamper with or to replace the CPU-Memory unit causes the actuating circuits to become inoperative as already stated.

Further, the controls by signals NOH and NOL, GAH and GAL (normal mode and garage mode, respectively) also cause this apparatus to be disabled, because their corresponding signals AVH and GAH-GAL, at the output of the control board, cause the power relays, designed to act on the main engine circuits, to be energized.

The control by the signals NOL-NOH-AVH is present only when the ignition key is inserted so that, the state of readiness is resumed when the ignition key is extracted while the control by the signals G-GAH-GAL is permanent, whereby the apparatus is always disabled (provided that the valid combination has been entered).

Further, the control by signals G-GAH-GAL disables the capability of starting the engine through the start Key St and CPU, and enables the capability of starting the engine by means of the ignition key, in which case the normal conditions of operation of the engine are resumed.

Both these controls act on an electro-valve circuit 46 comprising an oscillator, shown as a whole by 55 in FIG. 6, which, through a power circuit 56, causes the solenoid electro-valve 46a to open and to allow the fuel to flow.

The use of oscillator 55 to control the electro-valve is provided for in order to have the electro-valve capacitively coupled to the power circuit 56 and to prevent it from being energized directly from the vehicle battery.

Infact the coil of the electro-valve is connected in series with a a.c. to d.c. bridge rectifier, having its d.c. side coupled to the solenoid or coil of the electro-valve and its a.c. side coupled, through a non-polarized capacitor, to the power circuit 56 that controls the electro-valve.

In FIG. 5a, all the components pulled up from supply +5D are diagrammatically shown, i.e. the general supply schematic for the components of FIG. 5 through supply +5D is indicated.

Further, the power relay R2 (FIG. 6), which feeds the relay of the electric starting motor MAV, is connected to a diode bridge 57, having the function of dampening possible anomalous pulses (sparks), coming from the motor itself.

From the foregoing, it is clear that the apparatus of this invention is enabled or put in its state of readiness, with the engine stopped, when the signals NOL-NOH (valid combination) or the "ignition key inserted" signal 12C are false. Thus, with the ignition key inserted, it is possible to depress the stop key St in order to stop the engine and to freely move the various alarm sensors; infact depression of stop key resets CPU 48, which now waits for a valid combination to be entered by means of digit keys N, disabling the power relays. Keeping the ignition key inserted, a valid combination must be entered and start key must be depressed in order to restart the engine.

Conversely the apparatus is disabled by the signals NOH and NOL true, or GAH and GAL true, and by the contemporary presence of the signal of ignition key inserted into its on position (signal 12 C).

At the moment in which the apparatus is put in its state of readiness, as usual, a delay time, called exit time, determined by a R-C unit 59 (FIG. 5), starts and keeps still disabled all the system for its duration. When the delay time has elapsed, the apparatus is really active.

In the state of readiness, the presence of a signal (instantaneous input) coming, for instance, from the usual normally-open contacts, which close upon opening of a door, bonnet, lid, folding hood, sliding roof, or the like, causes the alarm relay R3 to be energized at once. The alarm relay R3 is controlled by a timing circuit, which energizes it for about twenty seconds and deenergizes it for the next about four seconds, as it is well known.

At the same time the relay R3 is energized, a time, called "reset time", starts and, if at the end of this time the conditions, that have caused the energization of relay R3, are not yet present, the alarm devices are turned off and the state of readiness is restored.

The apparatus is further provided with a time-delay input so that a normally-open contact swith, installed at the driver door, in the state of readiness of the apparatus, causes a time, called "entry time", to start upon opening of the door; at the end of the entry time, the energization of the alarm relay R3 takes place with the same procedure as above described, if this apparatus had not been disabled by entering the valid combination.

The apparatus according to this invention thus requires entering the valid combination in order to be disabled, in addition to having inserted the ignition key. Conversely it is sufficient to stop the engine by depressing the stop key Sp and to extract the ignition key, in order to prevent all the engine circuits, on which the apparatus acts, from operating.

Summarizing, the apparatus is used as follows: with this apparatus installed and therefore enabled or in its state of readiness, with the engine stopped, the setting of the initial combination, desired and choosen by the user, is performed by depressing the combination changing push-button CC and by depressing and releasing the Stop key; during setting of initial combination, the digit keys N remain lightened.

The initial combination, thus set, must be entered by depressing the digit keys N, each time the apparatus shall be disabled and the engine shall be started.

Thus, when it is desired to start the engine, the valid combination must be entered (keys N lightened) and, at the end of the valid combination, keys N will be turned off and warning lights of start and stop keys will be turned on.

At this moment, the engine can be started by depressing the Start key, after the ignition key has been inserted: in this case CPU 48 sends signal AVH to the actuating board, which issues signals R1 and R2, which energize the power relays. Thus the burglar alarm apparatus is disabled.

When it is expected that the car is to be parked in public garages, where the car must be started by means of the usual ignition key, from the conditions of engine in motion, it is sufficient to depress the garage key G and extract the ignition key in order to stop the engine while the apparatus is kept disabled; infact, key G does not stop the engine, but only brings the ignition key into its normal use and, under these conditions, CPU 48 still remains energized with the ignition key extracted, due to the fact that, the valid combination being still present, by depressing the garage key G, signals GAH and GAL are sent to the actuating board 32, which signals inhibit all the functions of the keyboard, except the STOP function.

The stop function is kept on in order to have the opportunity of automatically putting the apparatus in its state of readiness, by simply extracting the ignition key, at next stop of the engine. The green warning LED under the key G is on only when the ignition key is inserted.

Essentially the combination is therefore to be entered once only, at the departure, as the apparatus is put in its state of readiness each time the car is abandoned by simply depressing the stop key Sp and extracting the ignition key from its inserted position.

Although the preferred but not exclusive embodiment of this invention has been heretofore described, however many modifications and variations, both in its structure and operation, equivalent in their characters, may be applied for by a person skilled in the art without departing from the spirit of the present invention; it is understood that all these modifications and variations are encompassed in its scope, as defined in the appended claims.

For instance, the keyboard can be of other types, with similar operation; further, the processing unit comprised of CPU and memory ME and related circuitry can be replaced by multi-position switches (associated to the keyboard) and manually commutable, i.e. elements which can carry out, as a whole, the same functions as the CPU+ME unit does. At last, the dimensions and the positionings of the various boards, as well as the lightening system, the number of the instantaneous and time-delayed contacts and more other circuits can vary according to the design requirements or as one likes.

What is claimed is:

1. A burglar alarm apparatus with electronic memory and digital disabling combination, particularly for use in motor-cars, motor boats or the like, comprising:
(a) an electronic control board having:
   (i) a keyboard provided with a plurality of digit combination entering keys, an engine start key, an engine stop key, a garage key, by means of which garage key the apparatus can be disabled after a valid combination has been entered, still keeping the normal ignition key operation on,
   (ii) a processing unit, responsive to said keyboard and preferably including a microcomputer, controlling the operation of the whole apparatus, an electronic memory connected to said microcomputer and having the initial combination stored in, a reset circuit for generating an enabling reset signal for said microcomputer whenever said stop key is depressed; and
(b) an electronic actuating board, responsive to said electronic control board and acting on the main engine circuits and alarms, having:
   (i) a driver circuit responsive to the microcomputer outputs and issuing control signals, upon the ignition key insertion, to the power relays which operate the signalling and electrical engine circuits of the motor-car,
   (ii) at least one alarm circuit with a time-delay relay.

2. An apparatus according to claim 1, further comprising a programming circuit, for setting said initial combination and storing it into said electronic memory, having a programming connector connected to the said microcomputer, said programming circuit being inserted by means of a combination changing push-button, the insertion of said programming circuit causing an exchange of signals to be scanned by the microcomputer upon the stop key is depressed.

3. An apparatus according to claim 1, in which said electronic memory has a memory area used as a buffer storage for temporarily storing the required characters before they are transferred into said memory.

4. An apparatus according to claim 1, in which said keyboard is an array type keyboard and said digit combination entering keys, said engine start key and said garage key are positioned at the intersections of the columns and the rows of the array.

5. An apparatus according to claim 1, in which said electronic control board further comprises a plurality of light sources for programmably lighting said keys of the keyboard and a plurality of integrated circuits in said processing unit for programmably energizing said light sources under the control of the microcomputer.

6. An apparatus according to claim 5, in which said light sources are light emitting diodes (LED's).

7. An apparatus according to claim 5, in which said light sources are lamps.

8. An apparatus according to claim 1, further comprising an auxiliary accumulator for said electronic memory.

9. An apparatus according to claim 8, further comprising a stabilized voltage regulator circuit for charging said auxiliary accumulator.

10. An apparatus according to claim 1, in which said electronic actuating board further comprises an electro-valve circuit for opening a solenoid electro-valve which intercepts the flow of fuel.

11. An apparatus according to claim 10, in which said electro-valve circuit comprises an oscillator which allows said fuel electro-valve to be energized through a capacitive coupling, the arrangement being such that any d.c. supply coming directly from the car battery to the electro-valve is avoided.

12. An apparatus according to claim 11, in which said oscillator is coupled, through said capacitive coupling, to a a.c. to d.c. bridge rectifier, which is in turn connected to the usual coil of the electro-valve.

13. An apparatus according to claim 1, in which said electronic actuating board further comprises a frequency discriminator circuit, consisting of two timers, responsive to the opening frequency of the distributor points and feeding a starting consent signal to the microcomputer, the arrangement being such that, whenever the engine overcomes a predetermined angular speed, the starting consent signal is changed in its logic level, thus preventing the microcomputer from starting the engine while it is still in motion.

14. An apparatus according to claim 1, in which said driver circuit further comprises a tamper circuit preventing said power relays from operating.

15. An apparatus according to claim 14, in which said tamper circuit comprises a silicon controlled rectifier (SCR) having its gate grounded through a jumper located on said control board and connected to the SCR gate through the cable coupling the control board to the actuating board.

16. An apparatus according to claim 1, further comprising supplementary circuits and relays, for operating alarm devices already installed on the motor-car, responsive to the control signals of said driver circuit.

17. An apparatus according to claim 1, further comprising normally-open contact switches with quick action located at the doors, bonnets, lids, folding hoods and sliding roofs, instantaneously energizing said alarm circuit upon the opening of said doors, bonnets, lids, folding hoods and sliding roofs.

18. An apparatus according to claim 1, further comprising normally-open contact switches with delayed action placed at the doors, bonnets, lids, folding hoods, and sliding roofs, delayingly energizing said alarm circuit upon the opening of said doors, bonnets, lids, folding hoods and sliding roofs.

19. An apparatus according to claim 1, further comprising a reset generating circuit responsive to said stop key and to a main power presence signal for generating said reset signal whenever main power fails.

* * * * *